(12) United States Patent
Pope et al.

(10) Patent No.: US 10,999,303 B2
(45) Date of Patent: *May 4, 2021

(54) CAPTURING DATA

(71) Applicant: XILINX, INC., San Jose, CA (US)

(72) Inventors: Steven L. Pope, Cambridge (GB);
David J. Riddoch, Fenstanton (GB);
Derek Roberts, Cambridge (GB)

(73) Assignee: XILINX, INC., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/476,456

(22) Filed: Mar. 31, 2017

(65) Prior Publication Data

US 2018/0288082 A1 Oct. 4, 2018

(51) Int. Cl.
*H04L 29/06* (2006.01)
*G06N 20/00* (2019.01)
*G06N 5/02* (2006.01)

(52) U.S. Cl.
CPC ......... *H04L 63/1425* (2013.01); *G06N 5/025* (2013.01); *G06N 20/00* (2019.01); *H04L 63/0428* (2013.01); *H04L 63/0807* (2013.01); *H04L 63/0823* (2013.01); *H04L 63/123* (2013.01); *H04L 63/126* (2013.01); *H04L 63/20* (2013.01); *H04L 2463/121* (2013.01)

(58) Field of Classification Search
CPC ............ H04L 63/1425; H04L 63/0428; H04L 63/123; H04L 63/20; H04L 63/126; H04L 63/0823; H04L 63/0807; H04L 2463/121; G06N 20/00; G06N 5/025

See application file for complete search history.

(56) References Cited

U.S. PATENT DOCUMENTS

| 7,827,272 | B2 | 11/2010 | Poletto et al. | |
|---|---|---|---|---|
| 2008/0262990 | A1* | 10/2008 | Kapoor | G06F 9/505 706/20 |
| 2010/0043052 | A1* | 2/2010 | Park | G06F 21/305 726/1 |
| 2011/0078303 | A1* | 3/2011 | Li | G06F 9/505 709/224 |
| 2016/0028550 | A1* | 1/2016 | Gaddam | H04L 9/3263 713/173 |

(Continued)

FOREIGN PATENT DOCUMENTS

| EP | 1519511 A2 | 3/2005 |
|---|---|---|
| EP | 2042959 A1 | 4/2009 |

(Continued)

OTHER PUBLICATIONS

EP 18164965.8-1213—Extended European Search Report dated Aug. 3, 2018, 9 pages.

(Continued)

*Primary Examiner* — Ayoub Alata
(74) *Attorney, Agent, or Firm* — Haynes Beffel & Wolfeld, LLP; Andrew L. Dunlap; Paul A. Durdik

(57) ABSTRACT

A data analytical engine receives packets from a number of different network interface devices. The data is a replica of part or all of transmit or receive packets processed in the network interface device. A learning algorithm is applied to data from said different network interface devices and it is determined if an alert is to be generated.

13 Claims, 11 Drawing Sheets

(56) References Cited

U.S. PATENT DOCUMENTS

2017/0169217 A1* 6/2017 Rahaman .............. G06F 21/554
2018/0012293 A1* 1/2018 Jain ....................... G06N 5/003

FOREIGN PATENT DOCUMENTS

EP           2337305 A2    6/2011
GB          2302487 A     1/1997

OTHER PUBLICATIONS

Hood et al., "Probabilistic network fault detection," In Global Telecommunications Conference, Globecom'96.Communications: The Key to Global Prosperity, vol. 3, pp. 1872-1876, IEEE, 1996.

U.S. Appl. No. 15/939,152—Office Action dated May 13, 2019, 25 pages.

U.S. Appl. No. 15/939,152—Response to Office Action dated May 13, 2019 filed Aug. 13, 2019, 11 pages.

EP 18164965.8-1213—Office Action dated Aug. 23, 2018, 5 pages.

U.S. Appl. No. 15/939,152—Final Office Action dated Nov. 19, 2019, 24 pages.

U.S. Appl. No. 15/939,152—Office Action dated Apr. 1, 2020, 21 pages.

U.S. Appl. No. 15/939,152—Response to Final Office Action dated Feb. 13, 2020, 13 pages.

U.S. Appl. No. 15/939,152—Response to Office Action dated Apr. 1, 2020, filed Jul. 1, 2020, 27 pages.

U.S. Appl. No. 15/939,152—Notice of Allowance dated Aug. 19, 2020, 29 pages.

* cited by examiner

CAPTURING DATA

FIELD

Some embodiments relate to a method and apparatus for capturing data for analysis as well as a method and apparatus for processing the captured data.

BACKGROUND

Data networks may be arranged such that the monitoring and/or capturing of data flows is required. The captured data is analyzed to improve security of data networks, for example to detect and prevent intrusion and/or for network load management.

SUMMARY

According to an aspect, there is provided a data analytical engine comprising; an input configured to receive data from a plurality of different network interface devices, said data comprise all or part of data output to or received from a destination associated with said data; at least one processor configured to determine, using a learning algorithm applied to data from said different network interface devices, if an alert is to be generated; and an output configured to output said alert.

The received data may be generated in the respective network device by processing respective received or transmitted data.

At least some of said received data may comprise meta data added by a respective network interface.

The meta data may comprise one or more of a time stamp, an event generated as a result of processing of the data, state used in the processing which generated the event, connection rate, a timeout, and an error condition.

The input of the data analytical engine may additionally receive data packets from at least one network interface device indicating one or more events have been determined by the network interface device The at least one processor may be configured to determine that data of a particular type is required from one or more network interface devices and outputting information directed to the respective one or more network interface devices to cause the one or more respective network interface device to update stored rules.

The data analytical engine may comprise a memory configured to store information about at least one policy, wherein the at least one processor is configured to determine using said at least one policy and said learning algorithm applied to data from said different network interface devices for one or more flows associated with said data if a respective policy applies to said data and if not storing a new policy for those one or more flows in the memory.

The at least one processor may be configured to determine using a learning algorithm applying pattern analysis to data from said different network interface devices for one or more flows associated with said data to determine anomalous behavior.

The at least one processor may be configured to request historical data from a data store, and on receiving said requested use said historical data in said pattern analysis applied by said learning algorithm.

The learning algorithm may be configured to perform pattern analysis for one or more cascaded transactions relating to a higher order transaction in said received data.

The learning algorithm may be configured to perform pattern analysis such that the analysis forms features which are constructed to discriminate said higher order transaction.

The features may be used by said learning algorithm as part of a training set to form beliefs of said learning algorithm.

The learning algorithm is configured to update a policy or provide a new policy in response to pattern analysis for one or more cascaded transactions relating to a higher order transaction in said received data.

The at least one processor may be configured to generate an alert if the learning algorithm detects that a network flow, network packet, transaction or cascaded transaction which is not covered by any existing policy or is contrary to the beliefs of the learning algorithm for normal behaviour.

The input may be configured to receive said data from said network interface device via a secure control plane.

The secure control plane may be encrypted.

According to another aspect, there is provided a data analytical engine comprising; an input configured to receive data from a plurality of different network interface devices, said data comprise all or part of data output to or received from a destination associated with said data; a memory storing information about at least one policy; and at least one processor configured to determine using said at least one policy and a learning algorithm applied to data from said different network interface devices for one or more flows associated with said data if a respective policy applies to said data and if not storing a new policy for those one or more flows in the memory.

According to another aspect there is provided a data analytical engine comprising; an input configured to receive data from a plurality of different network interface devices, said data comprise all or part of data output to or received from a destination associated with said data; a memory storing information about at least one policy; and least one processor configured to determine using a learning algorithm applying pattern analysis to data from said different network interface devices for one or more flows associated with said data to determine anomalous behavior.

According to another aspect, there is provided a network interface device comprising: an input configured to receive data to be directed to a destination; hardware configured to provide: a packet encapsulater; and a security function, said packet encapsulater and said security function are configured to provide a data packet which is encapsulated, has a security function and at least of part of the data which is to be directed to said destination; and an output configured to output a first packet comprising said data directed to said destination and said encapsulated data packet, said encapsulated data packet being directed to a data analytical engine.

The security function may comprise one of encryption and authentication.

The network interface device may comprise a header processing engine configured to capture a packet having said received data and replicate at least a part of said packet for directing to said data analytical engine.

At least a part of said packet replicated by said header processing engine may be output to said packet encapsulator and said security function.

The network interface device may comprise a data store configured to store one or more rules which define which packets or parts of packets are to be replicated and directed to said data analytical engine.

The one or more rules may comprise a program configured to be executed with respect to said data packet.

The rules may be updated on the fly.

The rules provided by said data analytical engine may be treated separately to other which have been provided by a host operating system associated with the network interface device.

The rules which are provided by the data analytical engine may be of higher precedence and/or priority and may not be overwritten.

The network interface device may be configured in use to be securely bound to said data analytical engine, said network interface device being configured to receive one or more updates for said rules.

The rules may be configured to cause said header processing engine to replicate only the header or part of the header.

The said encapsulated data packet may have metadata, said meta data being provided by said network interface device.

The meta data may comprises a time stamp, an event generated as a result of processing of the data, state used in the processing which generated the event, connection rate, a timeout, and an error condition.

The output may be configured to output said data to the data analytical engine to a secure control plane.

According to an aspect, there is provided a method performed in a data analytical engine comprising; receiving data from a plurality of different network interface devices, said data comprise all or part of data output to or received from a destination associated with said data; determining, using a learning algorithm applied to data from said different network interface devices, if an alert is to be generated; and outputting said alert if generated.

The received data may be generated in the respective network device by processing respective received or transmitted data.

At least some of said received data may comprise meta data added by a respective network interface.

The meta data may comprise one or more of a time stamp, an event generated as a result of processing of the data, state used in the processing which generated the event, connection rate, a timeout, and an error condition.

The method may comprise additionally receiving data packets from at least one network interface device indicating one or more events have been determined by the network interface device The method may comprise determining that data of a particular type is required from one or more network interface devices and outputting information directed to the respective one or more network interface devices to cause the one or more respective network interface device to update stored rules.

The method may comprise storing information about at least one policy, and using said at least one policy and said learning algorithm applied to data from said different network interface devices for one or more flows associated with said data to determine if a respective policy applies to said data and if not storing a new policy for those one or more flows in the memory.

The method may comprise determining using a learning algorithm applying pattern analysis to data from said different network interface devices for one or more flows associated with said data to determine anomalous behavior.

The method may comprise requesting historical data from a data store, and on receiving said requested using said historical data in said pattern analysis applied by said learning algorithm.

The method may comprise performing pattern analysis for one or more cascaded transactions relating to a higher order transaction in said received data.

The method may comprise performing pattern analysis such that the analysis forms features which are constructed to discriminate said higher order transaction.

The features may be used by said learning algorithm as part of a training set to form beliefs of said learning algorithm.

The method may comprise updating a policy or provide a new policy in response to pattern analysis for one or more cascaded transactions relating to a higher order transaction in said received data.

The method may comprise generating an alert if the learning algorithm detects that a network flow, network packet, transaction or cascaded transaction which is not covered by any existing policy or is contrary to the beliefs of the learning algorithm for normal behaviour.

The method may comprise receiving said data from said network interface device via a secure control plane.

The secure control plane may be encrypted.

According to another aspect, there is provided a method performed in a data analytical engine comprising; receiving data from a plurality of different network interface devices, said data comprise all or part of data output to or received from a destination associated with said data; storing information about at least one policy; and determining using said at least one policy and a learning algorithm applied to data from said different network interface devices for one or more flows associated with said data if a respective policy applies to said data and if not storing a new policy for those one or more flows in the memory.

According to another aspect there is provided a method performed in a data analytical engine comprising; receiving data from a plurality of different network interface devices, said data comprise all or part of data output to or received from a destination associated with said data; storing information about at least one policy; and determining using a learning algorithm applying pattern analysis to data from said different network interface devices for one or more flows associated with said data to determine anomalous behavior.

According to another aspect, there is provided a method in a network interface device comprising: receiving data to be directed to a destination; providing a data packet which is encapsulated, has a security function and at least of part of the data which is to be directed to said destination; and outputting a first packet comprising said data directed to said destination and said encapsulated data packet, said encapsulated data packet being directed to a data analytical engine.

The security function may comprise one of encryption and authentication.

The method may comprise capturing a packet having said received data and replicating at least a part of said packet for directing to said data analytical engine.

The method may comprise storing one or more rules which define which packets or parts of packets are to be replicated and directed to said data analytical engine.

The one or more rules may comprise a program configured to be executed with respect to said data packet.

The rules may be updated on the fly.

The rules provided by said data analytical engine may be treated separately to other which have been provided by a host operating system associated with the network interface device.

The rules which are provided by the data analytical engine may be of higher precedence and/or priority and may not be overwritten.

The method may comprise receiving one or more updates for said rules from said data analytical engine via a secure connection.

The rules may replication of only the header or part of the header.

The said encapsulated data packet may have metadata.

The meta data may comprises a time stamp, an event generated as a result of processing of the data, state used in the processing which generated the event, connection rate, a timeout, and an error condition.

A computer program product may be able to cause any one or more of the previous method features to be performed. The computer program may be provided by a non transitory medium.

A computer program may be provided, said computer program comprising computer executable instructions which when run on at least one processor cause any one or more of the above method steps to be provided.

It should be appreciated that each of the above features may be used in combination with any one or more other features.

BRIEF DESCRIPTION OF DRAWINGS

Some embodiments will now be described by way of example only with reference to the accompanying Figures in which.

DETAILED DESCRIPTION OF EMBODIMENTS

Figure 1:
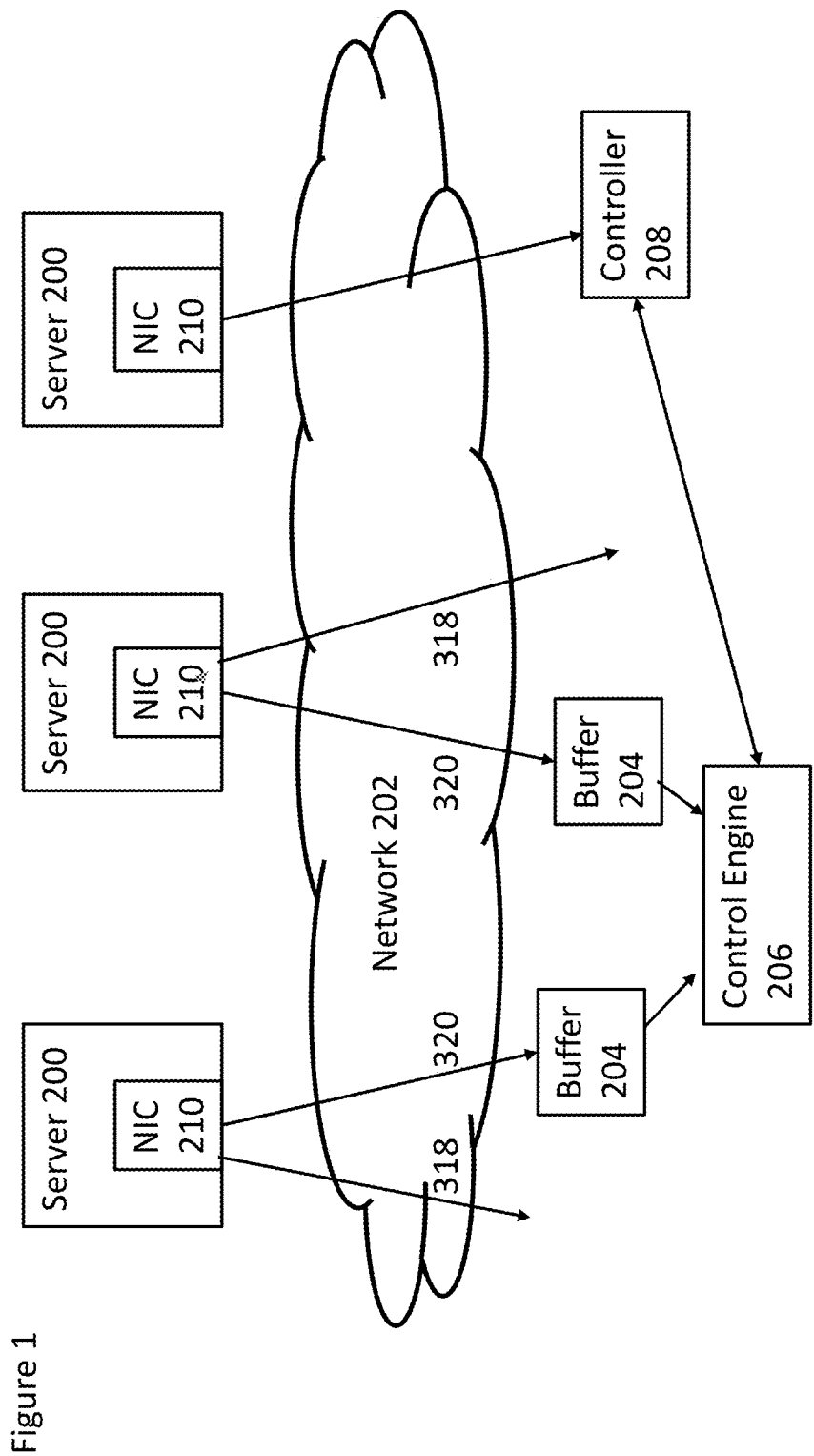
FIG. 1 shows a schematic view of a system of an embodiment.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Some embodiments may be provided in the context of a data network where monitoring of data flows is required and where analysis is carried out on the data flows. This may be in a data center or in the context of a closed or private network. Of course other embodiments may be provided in any other data network context.

The analysis of the data flows may be performed for network performance purposes, to determine a threat, for network management purposes, for statistics and/or for any other suitable reason.

A number of specialized analytic devices are known providing analysis of various types of data. By way of example only, such devices may provide financial, application, security or similar analysis. These devices are typically provided with a relatively small number of interfaces designed to capture, parse and analyze raw network frames. In a distributed network, such devices may be deployed using a direct capture deployment or a network connected deployment.

With direct capture, an analytics device is deployed wherever the network links containing the data are physically located and "plumbed in" to receive, optionally time-stamped, frames to be processed. In cases with many network links requiring analytics, the direct capture model may be inefficient as the number of analytics devices deployed is a function of the number of links of interest as opposed to the processing capacity of the analytics devices. As these analytics device may be complex and/or have very specific applications, it may be expensive to use these devices in the direct capture model. With direct capture, the analytics devices must be designed to guarantee capture under all network conditions even though off-line analysis only may be required. This can place burdensome requirements on the hardware required With network connected deployment, network devices such as aggregation switches can be used to deliver multiple links and deliver (optionally time-stamped) packets to the analytics devices. The network connected model may allow for more efficient scaling. However two limiting factors may need to be taken into account. The first is that these network aggregation switches will be aggregating traffic streams from multiple links at the rate that packets come in. These aggregated traffic streams are then delivered to the analytics device. However the capture, analysis and processing capacity of the analytics device may well be exceeded, especially when traffic levels are high e.g. financial market data at the time of market opening. The second factor with any aggregation of network interfaces is that there may be the potential for the aggregate ingress packet rate to exceed the available egress packet rate. Network devices can buffer frames, however the devices used currently typically only have in the order of 10 MB of buffering available. For example, 10 MB represents ~1 ms of line-rate 10 GbE traffic. It would therefore only require 10 input ports being aggregated to a single output port to receive more than ~100 µs of traffic concurrently for loss to occur with frames being dropped and thus never be received by the analytics device. Once these frames have been dropped, they are lost forever from the analytics device's perspective leaving the analytics device to work on an incomplete data set.

Analytics devices where processing happens at the point of capture by definition miss out on correlations between events which are occurring at other points in the data center. The analytics device may as a second step cross correlate their analysis in an attempt to generate data center wide analysis but the initial step of data-synthesis/reduction will mean that potentially important information may be lost Some embodiments provide a different approach.

Some embodiments may augment switches that may act as capture points (for example using protocols such as NetFlow and S-Flow). In embodiments, the captured flows are protected from tampering as they traverse the network. Some embodiments may implement a separate domain of trust for the captured flows. This may mean that malicious behavior of switches may also be detected Reference is made to FIG. 1 which schematically shows a plurality of servers 200. In this example, the servers 200 are sources of packets. The servers 200 are arranged to put packets onto a network 202 via a one of more NICs 210. Embodiments may require the network to be able to support an increased bandwidth. However, in practice, such an increased bandwidth is generally simple to achieve and often may simply be provided by unutilized bandwidth.

It should be appreciated that the source of packets may be any suitable source of packets. A server is just one example of such a source. Another example of a source may be a switch or a device connected to the network. The packets may be generated inside an internal system and/or be received from an external system. Each entity which sends packets is usually also able to receive packets. In embodiments, each entity which receives and/or transmits packets is associated with a NIC. An entity may share a NIC with at least one entity, have its own NIC or have more than one NIC.

The network may be an internal network, an external network or both.

The network 202 can be treated as an untrusted domain. Each NIC is configured to direct a copy of the packets which it receives to a capture buffer 204. The system may be set up so that any packets which are received by NIC from a network and/or packets which are to be put onto the network by the NIC are sent to the capture buffer. In some embodiments, one or more NICs may only direct a copy of incoming packets to the capture buffer, and/or one or more NICs may only direct a copy of outgoing packets to the capture buffer and/or one or more NICs may direct a copy of incoming and outgoing packets to the capture buffer. Some or more of the packets may be replicated. Some or more of the content of a given packet may be replicated.

In some embodiments, a plurality of capture buffers is used. However, it should be appreciated that in some embodiments a single capture buffer 204 may be used. In those embodiments which use a plurality of capture buffers, the capture buffers may be co-located or may be provided at distributed locations. There may be additional data buffering at the analytical engine. In those embodiments where the analytical engine has buffering, one or more of the capture buffers may be omitted.

The contents of the capture buffer or buffers are passed to an analytical engine 206. The analytical engine, as will be described in more detail later, is able to correlate communications from a number of different NICs. It should be appreciated that the capture buffers may be omitted in some embodiments and the data simply passed to the analytical engine which has some data storage capacity. In this scenario, the analytical engine would process the data substantially in real time. However, it is preferred that there is a capture buffer as this provides elastic storage as the quantity of data captured may depend on the time frame over which the data is being captured and/or volume of data. In some scenarios, it is desirable to have data for a given time period to assist in determining if a feature is normal or if an alert should be generated. The data in the capture buffers may thus be for at least the given time period.

A capture buffer (storage device/s) may be integrated with the analytics engine in a single appliance. Two or more capture buffers may also forward on data to the analytical engine on demand. This enables data to be captured locally and only transferred over the network when required by the analytical engine. This may for example be in response to the analytical engine performing a deeper analysis after being triggered by an event. The capture buffers may alternatively or additionally be distributed. For example the capture buffers may make use of small pools of non-volatile storage which are provisioned throughout a data center. In this regard, some or all of the elements of FIG. 1 may be provided in a data center.

The packets will also be directed by the NIC to their intended destination via, for example via the network. In embodiments, the normal processing of a packet by a NIC is unaffected by the directing of the copy to the capture buffer.

FIG. 1 shows one of the servers 200 has its NIC 210 with a secure connection with a controller 208 in a trust domain. This allows the rules which are applied by a NIC to be updated. This is discussed later in more detail. The controller may 208 may receive an output from the analytical engine 206 which is used by the controller to set up or modify the rules of a NIC. In practice, a NIC will have a secure connection to the controller 208 and a connection to the analytical engine 206. In some embodiments, the function of the controller is provided by the analytical engine and can be regarded as being part of the analytical engine.

Figure 2:
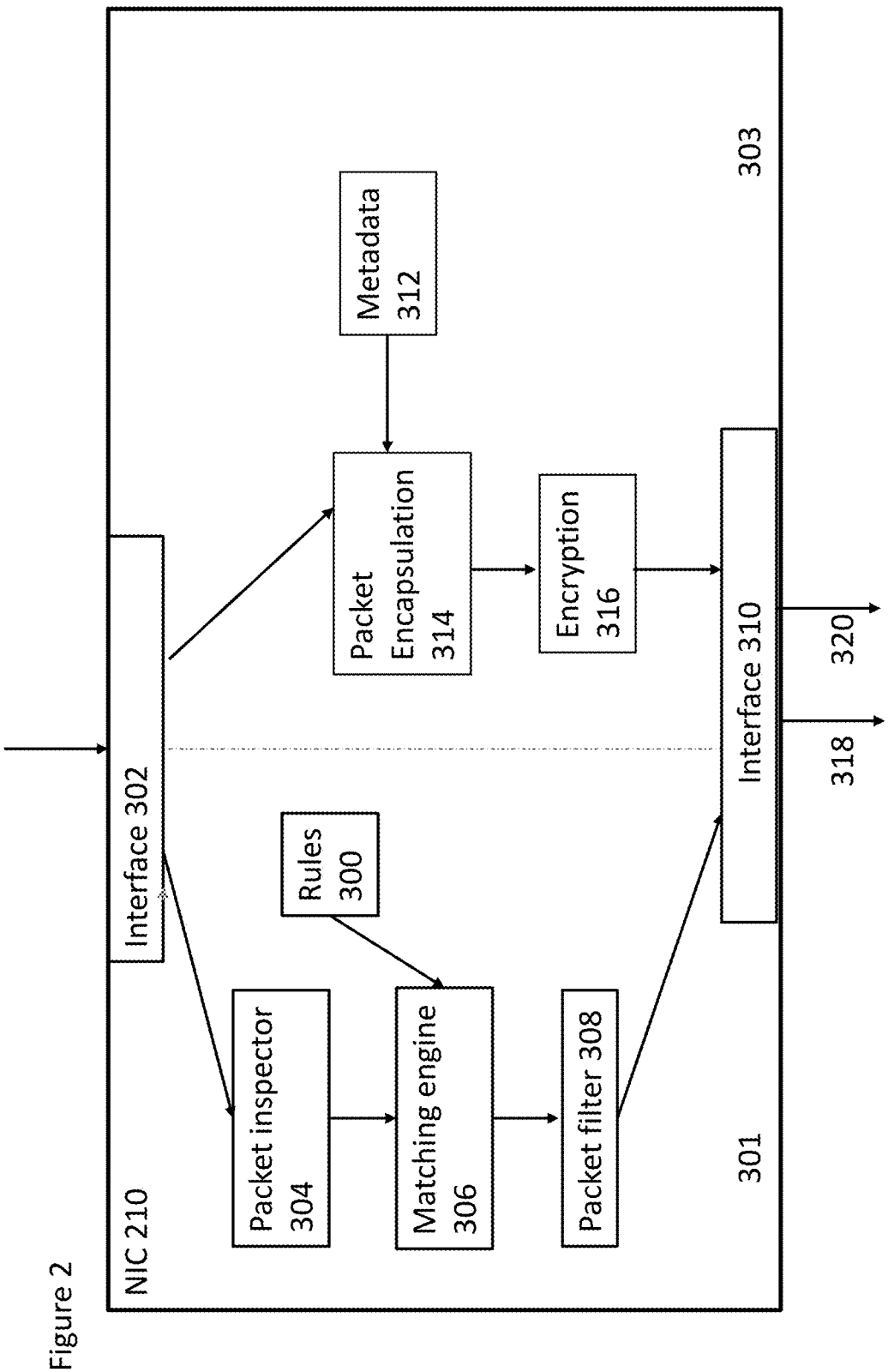
FIG. 2 shows in more detail a network interface device of FIG. 1.

Reference is made to FIG. 2 which shows a NIC of an embodiment. The NIC has a first interface 302 which is configured to receive packets which are to be output by the NIC via a second interface 310. In some embodiments, the first and the second interface may be provided by a common interface. The various blocks shown in FIG. 2 represent function provided in the NIC. The data path in the NIC implement a chain of micro engines which parse, classify, match then perform an action for each ingress/egress frame. This will be discussed in more detail later.

Schematically, the so-called normal processing of the packet takes place in part 301 of the NIC and the generating of the copy of the packet which is to be directed to the capture buffer takes place in part 303. It should be appreciated that the representation of the NIC shown in FIG. 2 represents the functions which are performed by the NIC. One or more of the functions shows in FIG. 2 may be performed by computer software running on hardware, with program code stored in memory. One or more functions may alternatively or additionally be performed by hardware circuitry.

The processing which takes place in part 301 will now be described. At least part of function 301 may be performed in a reconfigurable logic device, such as an FPGA, an ASIC or the like. Part 301 comprises a packet inspector 304, a matching engine 307 and a packet filter 301. A data store 300 includes rules and corresponding actions that are to be performed. The rules may be simple rules and for example may define one or more of a black list of flows which are not permitted, a white list of flows of permitted flows, and one or more limits such as connection rate limits, bandwidth limits and packets. The rules may define the actions to be taken. For example a packet may be dropped or allowed to be delivered to its destination. Alternatively or additionally, an event may be generated and output on a control channel. Events may be sent separately to the captured packets on the control channel. In some embodiments, events may be considered as another form of meta-data.

The packet filter may perform an action specified in the data store which corresponds to the rule which has been triggered.

In order to perform rules that relate to limits such as number of packets from a particular destination or a total number of packets, the matching engine is configured to maintain state sufficient to allow the matching engine to perform such rules. The matching engine could be configured to store the state at data store. For example, if a rule causes the matching engine to monitor the total number, the matching engine would maintain state identifying the total number of packets and update that state on receiving new packets. This would allow the matching engine to identify when a predetermined cap has been reached and to, in response, perform a corresponding action identified in the data store.

The rules that are to be enforced are written to data store by the controller. The controller may be provided by a control application which may be embodied in software or hardware). A separate, secure, connection is provided between the data store which stores the rules and the controller. This secure connection permits the rules to be updated. In some embodiments a dedicated link may be used between the NIC and the controller for updating the rules. In other embodiments, the communication is via the network.

The packet inspector 304 is arranged to parse incoming packets received over interface 302 so as to enable the relevant rules for each packet to be identified in the data store 300. Rules could be selected from data store 300 on the basis of any suitable information in the packets. For example, different rules could be applied to flows directed to different endpoints. The rules may themselves be programs expressed in a language such as BFP or regular expressions.

It should be appreciated that more than one rule may be applied to a given packet.

The packet inspector may be configured to perform a lookup into the data store on the basis of given identifiers. For example, data representing the source/destination of a packet may typically be included in the header of a data packet.

Providing that the packet passes the filter, the packet is passed to the second interface and output as indicated by reference 318. This output packet is directed to the destination, for example via the network.

Reference is made to part 303. In this part, the packet which is received via the first interface 302 is passed to a packet encapsulation function 314 which also receives metadata from the metadata function 312. The encapsulation allows the control channel to be addressed to the controlling endpoint.

In some embodiments, the metadata is time stamp information which gives the time at which the packet was received. In some embodiments, metadata can be appended to the packet. In other embodiments an encapsulation is defined for a structured object containing one or more fields which represent metadata and a packet contents field. The control channel between the NIC and the analytical engine can be datagram oriented or a byte stream.

As mentioned the metadata may be time stamp information. However, there are alternative or additional examples of metadata that may be included. For example, metadata could include an event which was generated as a result of the NIC processing that packet. The metadata may alternatively or additionally contain any state which was used in the processing which generated the event—such as a connection rate, a timeout, an error condition and/or the like.

The packet encapsulation function will encapsulate the packet with the meta data and pass the encapsulated packet to the encryption function, which encrypts the packet. The encrypted packet is passed to the second interface 310 and output as referenced by reference 320. This output packet is directed to the capture buffer, as shown in FIG. 1. In some embodiments, encryption is performed using TLS and the AES cypher. With this embodiment, the transport headers of packets being transferred on the control channel are visible but the payloads are not. It should be appreciated that other embodiments may uses any other suitable encryption.

It should be appreciated that in one modification, the encryption may be performed before encapsulation. In some embodiments, the encryption and encapsulation may be performed together.

In alternative embodiments, instead of encryption, authentication of messages may be used. The messages on the control channel would be digitally signed but not encrypted. This may be useful in some embodiments as authentication is typically less processing intensive. However, generally this would provide a lower level of security in some embodiments.

The data which is sent to the analytical engine is generated by processing RT/TX frames wholly within the NIC.

Figure 3:
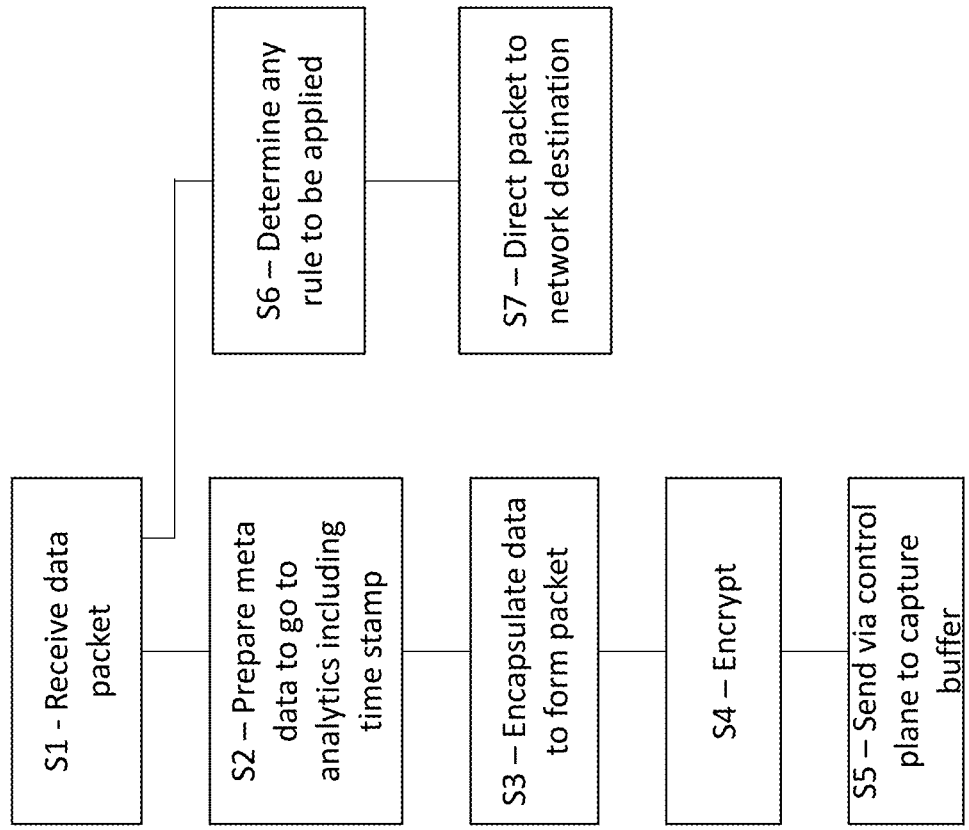
FIG. 3 shows a flow diagram of steps taken in the network interface device of FIG. 2

Reference is made to FIG. 3 which schematically shows a method carried out in the NIC.

In step S1, a packet is received from the server.

In this example, the packet may be checked in step S6 to determine if any rule is to be applied to the packet. For example, the NIC device may have a black list or a white list which may block or allow traffic for particular IP flow, source or destination. In this way, some packets may be discarded by the NIC. Other packets may pass these checks.

In step S7, any packet which is not discarded will be directed to its destination. This is the usual behavior of the NIC.

Additionally, in some embodiments, the NIC will ensure that a copy of the data is forwarded to the capture buffer. The NIC will in step S2 prepare metadata, for example a time stamp, which is to be provided to the analytical engine with the packet.

In step S3, the packet data is encapsulated with the metadata to form a packet.

In step S4, this packet is encrypted. This is because the packet which is destined for the analytical engine 206 passed through an 'untrusted' network.

In step S5, the data packet is output by the NIC via the control plane and directed to the capture buffer.

In some embodiments step S3 may be performed after steps S4. In some embodiments, step S3 and step S4 may be performed in the same operation.

The headers of a data packet tell a system handling the data packet all of the information it needs to know in order to correctly route the payload data of the data packet to its destination and to respond appropriately to the originator of the data packet. Without the packet headers the payload data is simply a series of bits without any context and a computer system would not know how to handle the data. On receiving a data packet a computer system therefore processes the headers of the data packet in order to determine what it is going to do with the data packet.

Header processing in hardware may be performed by the NIC. As will be discussed the HPE may perform at least some of the functions shown in FIG. 2. As each data packet is received, the network interface device parses the headers of the data packet and performs such operations as: performing checksums, extracting data and looking up the intended destination of the data packet using the address data in the headers. The operations performed generally depend on the type of headers present in the data packet. Since multiple operations are typically required for each data packet and there can be millions of data packets arriving over a network every second, the headers should be processed as efficiently and with as little latency as possible.

Accordingly in some embodiments, the NIC may be arranged to use a header processing engine HPE such as described in EP2337305 in the name of the present applicant which is hereby incorporated by reference. Some aspects of that header processing engine will now be described with reference to FIG. 6.

Figure 6:
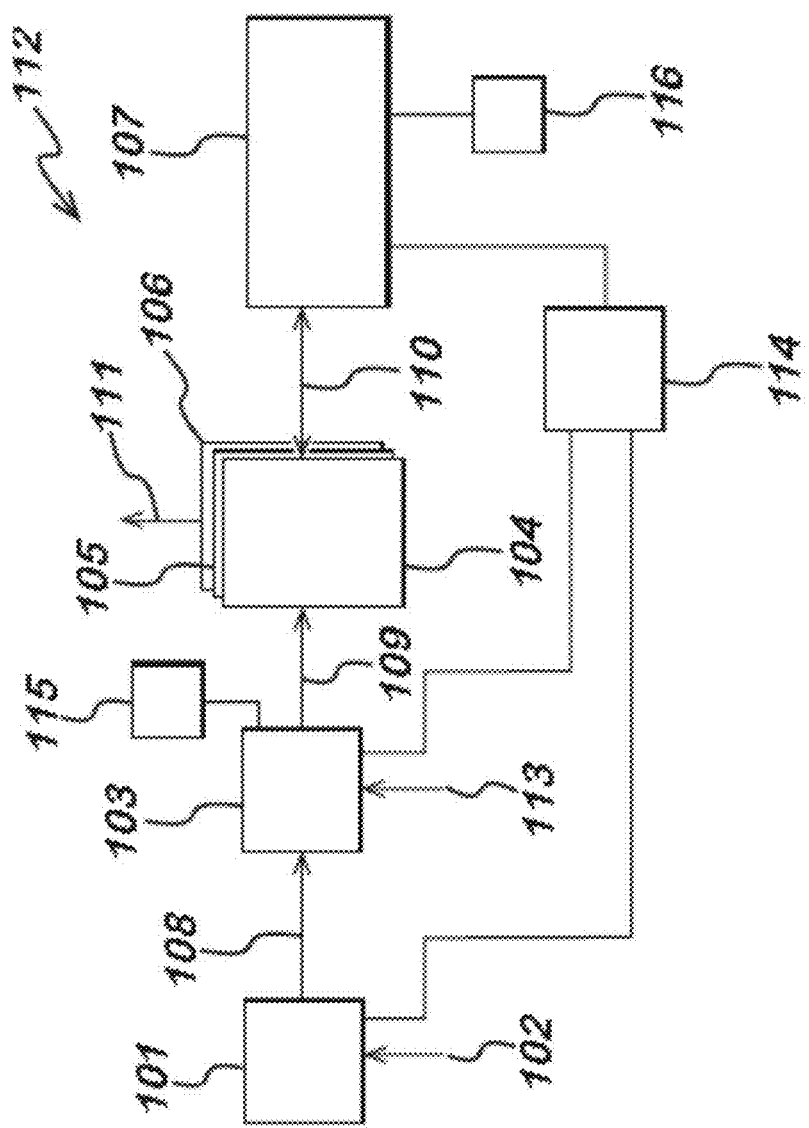
FIG. 6 shows a header processing engine provided in the network interface device.

The header engine of FIG. 6 has a pipelined architecture and provides a mechanism for representing the various header layers of a data packet with a single identifier and for providing a data structure having all the data required for processing the headers of that data packet. The header processing engine can be used to process the headers of data packets received over a network at a network interface device so as to allow incoming data packets to be deconstructed. The header processing engine can be used to process the headers of data packets being prepared for transmission over a network by a network interface device so as to allow outgoing data packets to be properly formed. Typically, a header processing engine can be configured to perform processing on the headers of a packet relating to network protocols at any of layers 2 to 5 of the Open System Interconnect (OSI) model.

Note that the term "header" is used herein to refer to network or application protocol data structures which are embedded within a data packet. A header may be any information represented by a set or string of distinguished bits at any point in a data packet—for example, a "header" as referred to herein could be a set of data bits (which could represent an OSI layer, e.g. TCP protocol data) within the nested headers of a data packet, the footer of a data packet (e.g. representing a CRC), or at any other point in a data packet (e.g. an embedded http URL). Thus, each header of a data packet is a set of data bits formatted in accordance with a particular network data protocol with which the data packet complies.

The HPE comprises a header recognizer (HR) 101, a header slicer (HS) 103 and a dispatcher 107. The header recognizer and header slicer are arranged to read the headers of data packets to be processed by the HPE. The payload data of the data packets is not required by the HPE because all the information relating to the processing of packet headers is found in the headers. Checksums and other parameters calculated in dependence on the payload data are not handled by the HPE—these would be performed by other dedicated engines within the NIC.

The header recognizer, header slicer and dispatcher are defined by the functions they perform. Each of these components of the HPE may be embodied as a discrete integrated circuit, or two or more of the components may be embodied in a single integrated circuit. The HPE could be embodied as part of a larger integrated circuit, such as a controller of the network interface device. The header recognizer and header slicer have read access to the headers of the partially or fully formed data packets which are to be processed by the HPE. These data packets are typically in a buffer memory at a network interface device having been received over the network, or being in the process of being prepared for transmission over the network. An HPE can be used on either or both of the transmit and receive paths of the network interface device.

In order for the data packets to be correctly handled the network interface device processes the headers of the data packets. The headers carry the information the network interface device requires in order to know what to do with each packet, including, for example: routing information necessary for delivery to a particular virtual interface, the parameters of the various protocols in which the packet is in accordance, checksums, etc.

The HPE can be configured to perform the various header processing required for the proper handling of network data packets. For example, the processing of headers by the HPE may provide the information required by the network interface device in order to effect the delivery of received data packets (or at least their payload data) into the appropriate receive queues. Typically this requires the HPE to cause one or more lookups to be performed at a forwarding table which indicates the correspondence between (to give IP data packets as an example) IP address and port combination and receive queue.

The processing performed by the HPE can also be used to enforce network protocols. For example, implementing firewalls, or preventing denial of service attacks.

The processing performed by the HPE can also include modifying the contents of received data packets so as to perform operations such as network address translation (NAT), which may be required for the translation of network addresses onto the address spaces supported at a virtualized system supporting multiple guest operating systems, or for the translation of network addresses at a network interface device acting as a switch or bridge between networks.

The NIC and/or the HPE can be configured to perform any header processing required prior to transmitting data packets onto the network. For example, the NIC can be configured to perform filtering and pacing of data packets for transmission onto the network using the HPE 112. Any data packets which have only partially-formed headers are be completed by the NIC before being transmitted onto the network.

For example, if the NIC is to safely provide direct access to the guest operating systems of a virtualized system, the NIC must examine all outbound traffic to ensure that it only contains legal and non-disruptive packets. In other words, if the NIC supports direct communication with a guest operating system (i.e. by means of a virtual interface and not via a hypervisor, or equivalent), it filters the communications of that guest OS so as to ensure that the guest OS only communicates with those network addresses to which it has been granted access by the privileged mode entity of the system (i.e. the kernel or hypervisor). This helps prevent any malicious code running at the guest OS hijacking the network connections of other guest OSes or the hypervisor. To effect packet filtering, the NIC is required to make a decision as to whether formed data packets are released onto the physical network or are discarded. The HPE is configured accordingly to provide the data on which this decision is to be made. Since the packet filtering is typically based on an identifier of the source of an outbound data packet, this would generally include a source network address from a header of each data packet from a guest OS.

In certain virtualized environments, a NIC is required to act as a proxy for the nearest upstream switch. In this case, the HPE can be configured to provide information that can be used to make a decision as to whether the outbound packet data is transmitted over the physical network, or looped back for delivery to another local operating system, or to both as part of a multicast operation.

The HPE may be further configured to modify data packets prior to transmission. For example, in a network in which one or more VLANs are operating, the HPE can be configured to write or update address information or other parameters stored at the headers of a data packet so as to ensure that the data packet is routed over the appropriate virtual and physical networks. This may require the HPE to perform address translation between virtual and physical network addresses. Thus, the HPE could be configured to update a VLAN header using data established by means of one or more lookups at a forwarding table of the NIC at which VLAN information for the network is held.

The header recognizer 101 performs the first step in processing a packet header and parses a data packet in order to identify the various header parts which make up the header of the data packet. The header recognizer reads the header of the network packet 102, which typically has several layers relating to the various network protocols in use over the network. For example, an Ethernet data packet might comprise Ethernet, VLAN, IPv4 and TCP headers. The header recognizer identifies the individual headers present in the compound header of the data packet by, for example, looking for characteristics such as the length of fields in the compound header, the format of the compound header and particular flags or data bits in the compound header.

Header recognizer 101 identifies each of the individual headers making up the header of the data packet and the offset at which each of the individual headers occurs in the data packet. The header recognizer is preferably implemented as a microprocessor having a dedicated instruction set. The instruction set can be made as wide as is required to parse the various header layers the header processing engine is expected to deal with. However, for typical Ethernet network interface devices supporting TCP/IP communications the total instruction width can be as small as 32 bits. As the header recognizer parses the data packet header, instructions are executed which determine, for example, the length of a header layer in a packet header, the type of a header layer, whether the end of the header has been reached, and the offset of a header layer in the data packet. The output of each instruction defines a command for slicer 103 which comprises instructions in the form of jump vectors that refer to instructions in the instruction memory 115 of the slicer. The particular set of slicer instructions forming the command depends on the particular type of header that the command deals with. One or more commands instruct the slicer how to deal with each layer of the nested headers of the subject data packet. The parameters of a given command typically inform the slicer where the corresponding header is in the data packet (i.e. its offset) and what type of header it is.

It is advantageous if the header recognizer forms a data word (hereinafter, "parser_info") comprising the header types and location information describing the offsets of the various headers in the data packet. The parser_info word can be built up bit by bit as HR 101 parses the header. By providing the word to a FIFO message buffer, other processing entities on the receive/transmit (as appropriate) data path can use the information generated by the header recognizer. For example, the information parsed by the header recognizer and formed into a parser_info word can be used by a checksum offload engine at the network interface device supporting the HRE.

Header slicer 103 receives the commands from header recognizer 101 by means of link 108 (which could be a simple FIFO buffer). The slicer is a microprocessor having a dedicated instruction set stored at a memory 115, with the slicer instructions being referred to by jump vectors in the commands received from the header recognizer. In response to each command the header slicer executes the set of instructions corresponding to the instructions jump vectors in the command using the parameters passed to it with the command. The instructions executed by the slicer build up a register file 104 which comprises all the data required by dispatcher 107 to process the packet header.

The register file comprises data read by the slicer from the header of the data packet and information generated by the slicer in dependence on the content of the header of the data packet. In order to process certain layers of a data packet header the dispatcher requires at least some of the data of the header; for such layers the commands from the header recognizer cause the slicer to execute instructions which read the required data and write it into the register file for the data packet over link 109. The dispatcher also needs to know the structure of the data packet; this knowledge is passed to the dispatcher by the slicer writing a packet class identifier into the register file for the data packet which uniquely identifies the composition of the data packet.

The slicer generates the packet class identifier which uniquely identifies the header types and their order in the header of the data packet. The slicer preferably forms the packet class identifier at a plurality of registers which hold the result of instructions executed at the slicer. For example, the header processing engine of an Ethernet network card could have the following sub-class registers:

mac_class 1 bit set if packet has a multi-cast destination MAC address,
eth_base_class 4 bits identifies the base Ethernet header, e.g. Ethernet, LLC,
eth-tag_class 4 bits identifies presence of any tags e.g. VLAN, VNTag 13_class 4 bits identifies the next protocol after base Ethernet, e.g. IPv4, IPv6, IPv4-fragment, IPv6-fragment, FCoE,
ARP14_class 4 bits identifies layer 4 protocol, e.g. TCP, UDP.

The registers are set as the slicer traverses the headers under the control of the commands generated by the header recognizer.

The manner in which a register file is built up can be better appreciated by considering the following example. The header recognizer parses the subject data packet and identifies a base Ethernet header. As a result, the header recognizer generates a command indicating the type (base Ethernet) and offset (its location) of the identified header to the slicer. The slicer receives the command and calls the set of instructions corresponding to a command indicating the presence of a base Ethernet header. These instructions cause the slicer to read predetermined parts of the base Ethernet header into the register file for the data packet and write one or more values indicating the presence of a base Ethernet header to the appropriate register of the slicer as a step in the formation of the packet class identifier. Once the end of packet header is reached, the slicer writes the completed packet class identifier into the register file.

Generally, the packet class could be caused to be written into the register file by one or more instructions triggered by, for example, a command from the header recognizer indicating the end of the header, a command from the header recognizer indicating a header layer which necessarily ends the data packet header, or a command from the header recognizer indicating a header layer which is not recognized.

A packet class identifier in its compressed form may be a literal reference to an entry in the instruction memory 116 of the dispatcher which contains the set of instructions which are to be executed in order to effect processing of the header of the subject data packet. This allows the dispatcher to directly access the set of instructions it is to execute for a particular data packet on reading the packet class identifier for that data packet The packet class identifier in the register file identifies to the dispatcher at least some of the instructions it is to execute on the data contained in the register file so as to effect the processing of the header of the subject data packet.

The register file of each parsed data packet is constructed by the slicer such that it identifies the sequence of instructions (the execution thread) which are to be executed by the dispatcher and includes any parts of the packet header required for the execution of those instructions. Thus, each register file includes all the data required by the dispatcher to process a data packet of the given packet class. The register file may contain at least some of the initial state of the execution pipeline of the dispatcher. Dispatcher processor 107 accesses the register file over link 110.

The dispatcher 107 performs the header processing using the register file constructed by the slicer. Header processing is generally required to ensure that a received data packet is properly handled (in the case of a HPE implemented at the receive path of a network interface device), or that a data packet for transmission has its header properly completed and the data packet is routed correctly onto the network (in the case of a HPE implemented at the transmit path of a network interface device). The processing steps performed for a data packet received over a network can include: performing look-ups in a forwarding table, performing network address translation, performing receive side scaling (RSS), and calculating hash values (possibly for use in any of the previously-listed steps). The processing steps performed for a data packet for transmission over a network can include: performing look-ups in a forwarding table, performing network address translation, completing checksums or CRC values, and calculating hash values (possibly for use in any of the previously-listed steps). A dispatcher can therefore include, for example, look-up logic for interfacing to a look-up table (such as a forwarding table) and a hash generator.

In order to synchronize the operation of the components of the header processing engine it is useful for there to be controller logic 114 which ensures that the header recognizer, slicer and dispatcher work in an efficient manner. The controller ensures that the current data packet is available to the header recognizer and slicer in the appropriate buffer until those two components have finished with the data packet. Also, once the slicer has finished constructing the register file, the controller queues that register file to the dispatcher and (if multiple register files are being used) the controller allocates a new register file to the slicer for the next data packet so that the slicer can begin constructing a register file for the next data packet whilst the dispatcher is processing the current data packet.

The controller logic can additionally be configured to hold a buffer into which at least part of a data packet for processing by the HPE is written.

It is advantageous if there are multiple register files (three are shown in FIG. 1: 104, 105, 106) supported at a memory. This is for two reasons: firstly, this allows slicer 103 and dispatcher 107 to operate on the register files in parallel—i.e. the dispatcher can load one register file and hence process the corresponding packet header whilst the slicer is constructing a different register file; secondly, this allows the dispatcher to perform context switching between the processor threads represented by the state stored in the register files.

The HPE is used to capture the packets which are directed to the analytical engine. Depending on the program(s) the HPE is executing, this will cause a given packet to be replicated and at least a portion sent to a management controller of the NIC. The management controller does not have visibility of every packet passing through the NIC, only the packets that the HPE sends to it. Equally the rules which cause events are all executed within the HPE, the events themselves are sent to the management controller which performs the encapsulation, encryption and transmission (to the analytic engine) functions.

The function of the entire data path can be changed by uploading a new firmware program for one or all of the engines (for example a program defined using the P4 programing language). This upload can be made through the control channel in response to different threats or behaviour changes. More generic rules may be through the control channel by expressing each rule as a program (for example using BPF) in this case the engines would execute the rule for each packet. Therefore both the rules and the types of rules supported may be modified on the fly and can be considered to be as expressive as any program which processes network packets.

Figure 4:
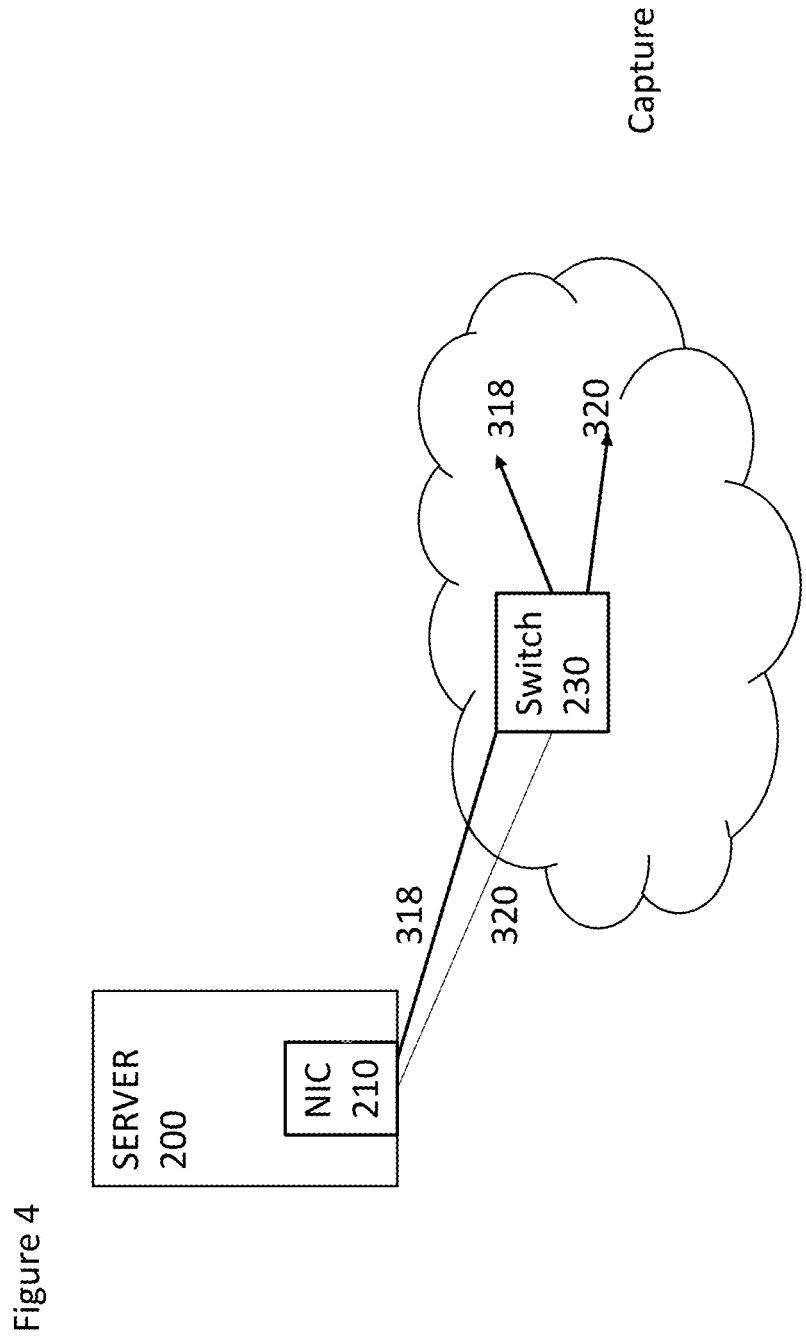
FIG. 4 shows in more detail the output of packets from the network interface device onto a network.

Reference is made to FIG. 4 which shows a view of the server with the NIC 210. The outputs 318 and 320 of the NIC are passed to a switch 230 in the network. The switch will direct the output packets 318 to the traffic flow associated with the destination for those traffic output packets. The switch 230 will direct the encrypted packet to the capture buffer.

In the above example, the processing of packets which are being output by the NIC to the network has been described. Alternatively or additionally, the processing of packets which are being received by the NIC may be performed. The processing of the incoming and outgoing packets may be the same in some embodiments and different in other embodiments. For example, the checking of the packets which are being put onto the network may be omitted.

In some embodiments, a packet which is received may be at least partially processed in the NIC. For example, the NIC may perform some or all of the protocol processing of the received packet. In some embodiments, a packet which is to output by the network may be at least partially formed by the NIC. The NIC may perform at least some of the protocol processing and/or formulate a response packet based on a received packet.

In some embodiments, all of the packets which were received by the NIC will be processed and sent to the capture buffer. In other embodiments, it may only be a subset of packets. Alternatively or additionally, only part of a packet may be transferred. For example, only the header or part of the header may be transferred to the capture buffer. The rules will define for a given packet what part if any of the packet is to be transferred to the capture buffer. This can be modified by the updating the rules, as described later. The packets which may be selected may be based on for example, header information, or may be selected randomly, or may be every nth packet. Preferred embodiments may have all of the packets being processed by the NIC and directed to the capture buffer.

Figure 5:
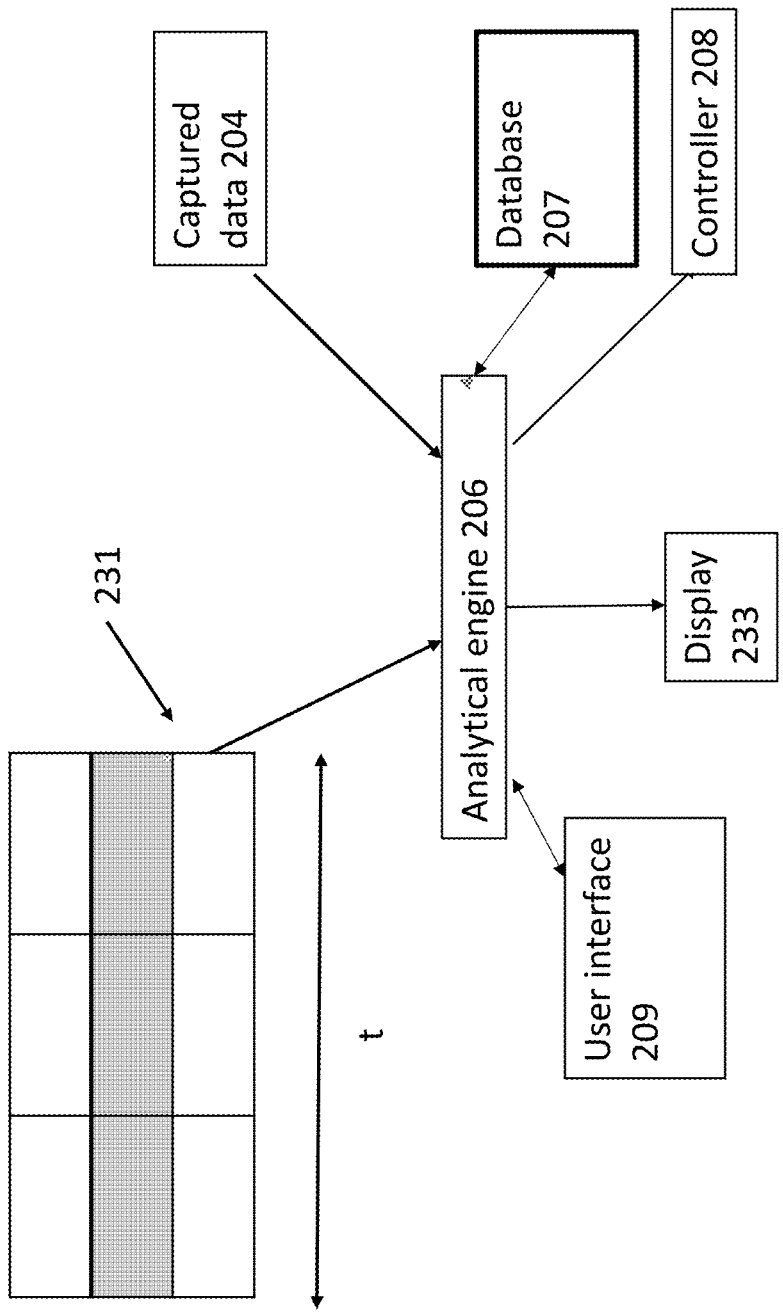
FIG. 5 shows an analytic engine system.

Reference is made to FIG. 5 which shows schematically shows the functionality associated with the network monitoring. The network is monitored by the analytical engine which is configured to receive data from a set of NICs. This is represented by reference number 231. The data is for a particular time frame and may be a substantially real time. The accuracy of the time stamp will depend on the precision of the NIC hardware timestamp implementation, the physical properties of the underlying network (for example one or more of clock speed, jitter and switch queuing) and the quality of the time synchronization protocol. Current best practice is that time synchronization to 50 ns is achievable within a data center and therefore the timestamps taken at different points can be considered to be comparable to a precision of 50 ns at analytical engine. This level of precision may be desirable in order to generate features which can be used to distinguish the cascading transactions which are common within a data center over very short time-scales. It should be appreciated that 50 ns is given by way of example only and different systems may have different values.

In other embodiments, the global precision of timestamps may of course be greater or less than this time period. It should be appreciated that the data is stored in the capture buffers is retained for long time periods. Thus the data which is provided by the NICs has a time stamp provided by the metadata. Thus this allows the analytical engine determine which data for which NICs are to be correlated, compared or otherwise analyzed taking into account the time when the data was received by the respective NIC.

The analytical engine may provide a tool to enable a user to define the role of each server.

The analytical engine may be configured to sample all network flows. The analytical engine may be configured to learn what constitutes normal behavior of the network and when to raise an alert. In a simple example, the analytical engine may have an understanding of which servers normally communicate with a particular server.

When a new server communicates with the particular server an alert may be raised. In some embodiments, an alert is generated when there is a new flow. An alert may be raised when a flow falls outside a defined policy. The defined policy may be for a particular server a set of servers (for example defined by a subnet) and/or for the system as a whole In some embodiments, the alerts may be provided to a user interface. For example the user interface may be in the form of a graphical display 208. In some embodiments, one or more alerts may be provided to another computer implemented process for control. In some embodiments, the analytical engine may be configured to implement a machine learning function or computer program. The machine learning function may be configured to recognize for example cascaded transactions. The machine learning function may be configured to extract features which are considered to be normal. The analytical engine uses what is considered to be normal to determine when there is abnormal behavior.

Some embodiments may use a machine learning algorithm such as a deep learning algorithm. The algorithm uses layers of processing units where successive layers use the output from the previous layer as an input. The analysis may involve classification and pattern analysis. For example every flow received by the analytical engine may be or attempted to be categorized as belonging to or satisfying a particular policy. Any flow which does not belong to any policy may cause an alert to be generated and output by the user interface. In some embodiments, the machine learning algorithm may be configured to define a new policy for that flow.

In some embodiments the learning may involve pattern analysis which looks at not just a particular packet but may look at other packets. The packets may be for the same flow over a window of time and/or may be other packets of other flows from the same or other NICs. The learning may be iterative in that the machine learning algorithm may repeat with various windows of time and/or other packets of other flows.

Some embodiments may learn patterns resulting from one action on a particular flow, where that one action may cause a number of other cascading actions on the same or different flows within time periods. From these learnt patterns anomalous behavior can be identified event even if individually each packet satisfied a particular policy.

In some embodiments, even if a flow or a higher-order feature such as a cascaded transaction is categorized as satisfying a particular policy, pattern analysis may still performed. This allows the determination of unusual patterns in permitted behavior to be determined. For example a look up to a billing server may be a normal action in response to a particular request but repeated look ups to that billing server in a short space of time may not be normal behavior and may be indicative of a malicious attack. More subtle changes in behavior can also be detected. For example the learning algorithm may determine that a look up to a billing server normally occurs within the pattern of a particular cascaded transaction which has been recognized as a feature comprising hundreds or thousands of sub-transactions occurring between many servers all within a short timescale of the order of milliseconds. If a single lookup to the billing server is detected which is not recognized as part of the known features of cascaded transactions then an anomaly may be detected.

It should be appreciated that any suitable technique may be used to perform pattern analysis. For example correlation of different packets or information from different packets may be performed.

The learning of patterns may be performed such the understanding of behavior in the network is continuously being refined to be less and less coarse.

The learning algorithm may be provided an initial training set which is generated from real data center traffic and/or synthesized traffic. The synthesized traffic may be created to specifically include known error conditions, anomalies and threats. The synthesized or real traffic may be based or selected on the known roles and topology of the actual data center and/or the policies which are in place.

The learning function may be partially trained from large common data sets and is specialized based on the per data center/per application variables. The learning function may be retrained as data center is changed. The discrimination of the learning function may be tested through the use of synthetic anomalies.

In some embodiments, the analytical engine may receive events from the NIC resulting from the processing function 301. This may be received by from the controller, as part of the encapsulated packet or in any suitable manner. Events may be generated which are not directly linked to any one particular packet. For example the aggregate connection rate to a particular service has been exceeded The analytical engine may be configured to take a slice of data from some or all of the NICs for a particular time frame and perform that machine learning on that slice.

In some embodiments, to assist in the machine learning process, the analytical engine may want data for a longer period of time and/or may want more detailed information— for example an analysis based on transport headers may indicate that a deeper analysis based on application headers and/or the entire payload is required. In this scenario, the data is retained in the capture buffer for a given amount of time before being discarded or stored in persistent storage. The given amount of time may depend on the storage available and/or on operation parameters of the data center, for example the level of security required. In some embodiments, the given amount of time may be at least 1 hour. In such an embodiment, the amount of data (sample rate/frame sample length) may be scaled to achieve this. Once an investigation has started, particular flows—application to application or from a particular machine may be reserved and kept for a longer time interval—potentially indefinitely.

The analytical engine may be reloaded with the historic traffic data.

The analytical engine may be provided with an AI or deep learning or any other suitable learning algorithm to learn what constitutes normal behavior for a network. The algorithm may be fed data. The data may be meta data or a mix of meta data and frame data. In response to the algorithm detecting an anomaly, the algorithm may request that more data around the anomalous feature be captured going forward and/or may repeat its analysis with more historical data which is delivered from the previous captures.

In some embodiments, the analytical engine may be configured to manage a large number of NICs. For example the number of NICs may be in the thousands.

The analytical engine may in some embodiments be regarded as a remote management function.

The analytical engine may be configured to connect to and communicate with thousands of NICs. Preferably, communication is secured using for example TLS. The analytical engine may have the ability to bind the NICs to an infrastructure domain (TSAID). The user interface 209 may be provided via a management port to manage rules (create, modify and delete). The user interface may be secured, for example with authentication. All rules are in suitable format. For example the NFTables format or IPTables format may be used in some LINUX based embodiments. In some embodiments, audit and/or alert logs may be generated by the analytical engine.

The database 207 may store binding information (as will be discussed later), rules and policies to be applied, and status information (e.g. binding status, connection status, TSAN ID (identifier for a particular NIC) and TSAN IP (the IP address used to communicate with the management controller on the NIC), The database 207 may store critical and persistent information.

During a set up process the analytical engine may be bound to each of the NICs. An example binding process will be described later. Binding may be a one-time process.

Once the binding is completed and a NIC is connected to the analytical engine, the analytical engine can download rules to the NIC for packet filtering. Rules may be supplied to the analytical engine by the user(s) either via command line. Rules can be programmed individually or in bulk via a file or generate by the learning algorithm as mentioned previously. The analytical engine stores the rules in the database. When the rules are downloaded to the NIC, the NIC generates a rules hash and provides this to the analytical engine.

The analytical engine periodically performs health checks and rules audits on the NIC. If a rule audit fails, the analytical engine deletes all existing rules from the NIC and installs rules again.

The analytical engine generates alerts for various events such as binding completion, connection loss with an NIC, and connection establishment with the NIC. The NIC also logs all user actions such as rules additions, modifications or deletions. User IDs may be tracked. Logs may be rotated periodically.

The analytical engine may store all state information in the database. The database may provide master-master synchronization scheme. The master-master synchronization may be used to ensure binding and connection data is synchronized between the instances of the system. In some embodiments, an NIC can bind and connect to any instance of the analytical engine successfully.

Figure 7:
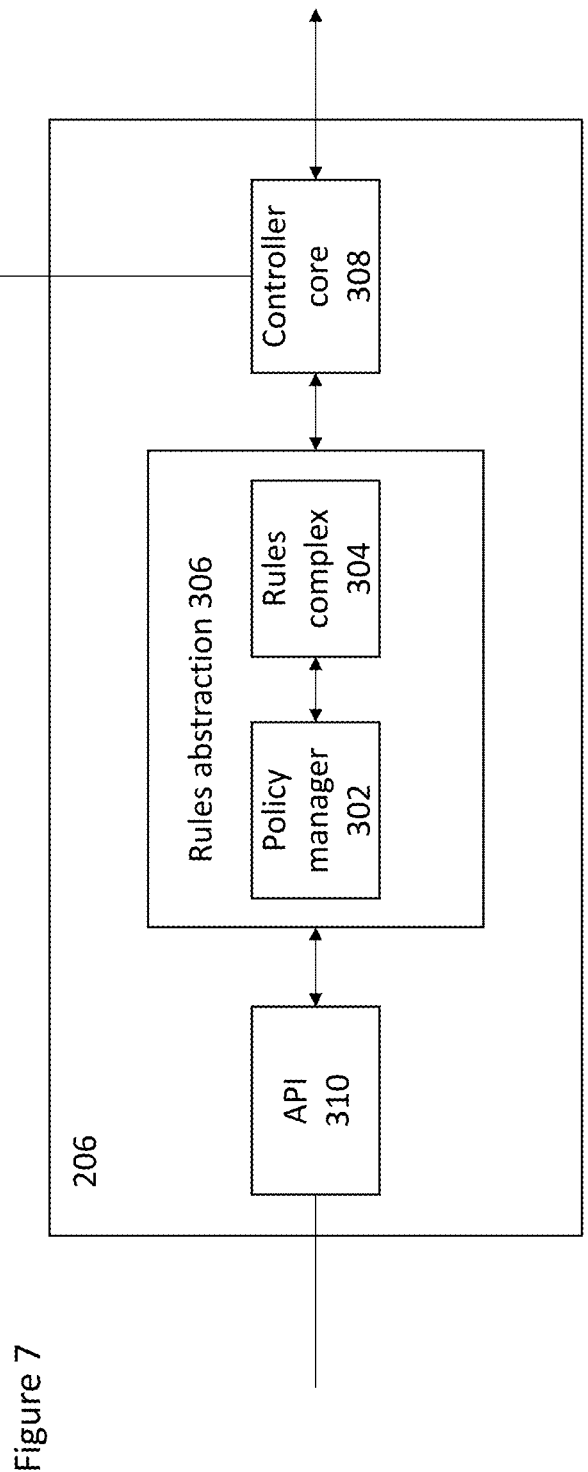
FIG. 7 shows schematically part of the analytical engine.
Figure 8A:
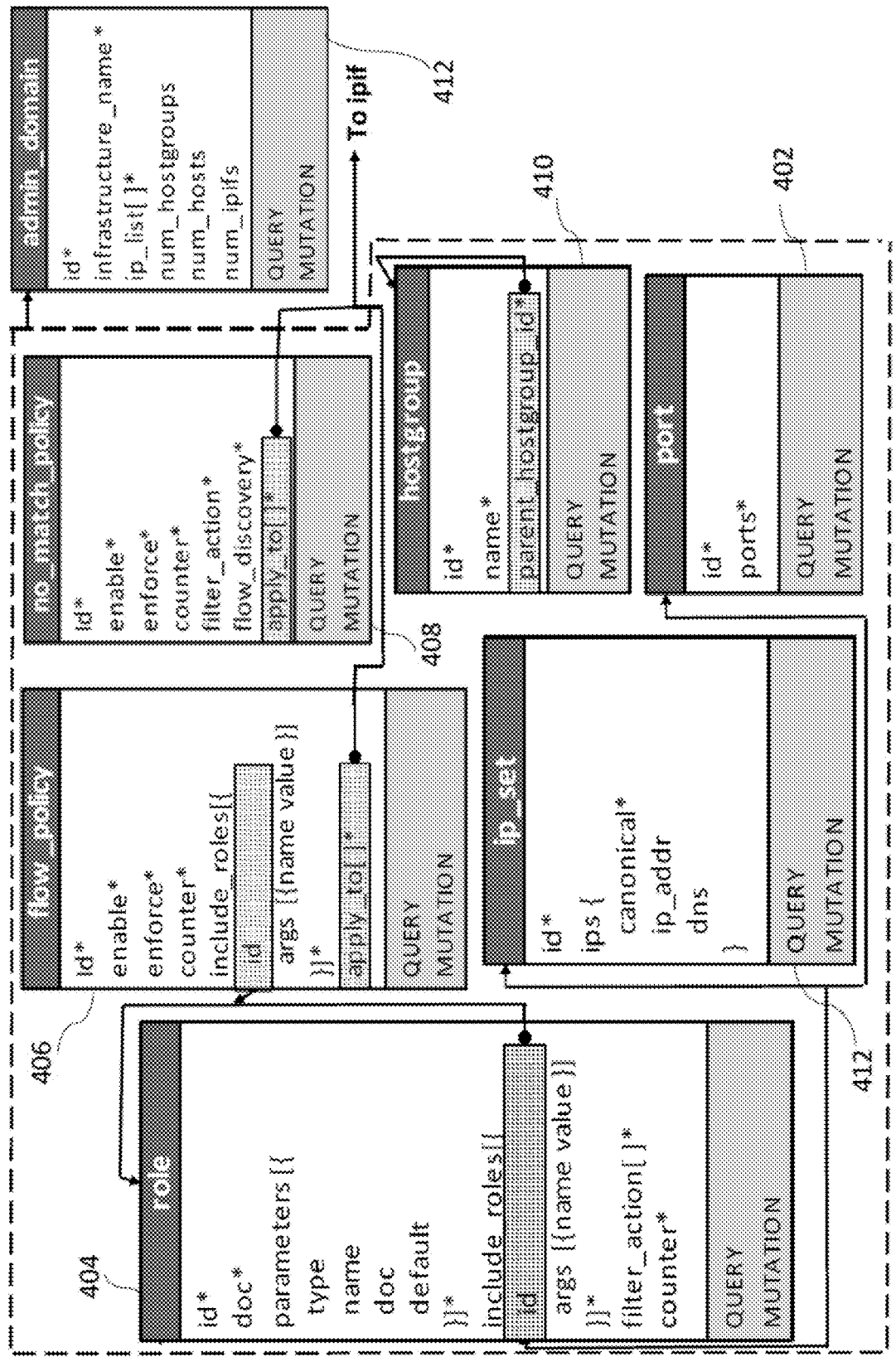
FIGS. 8A and 8B (collectively FIG. 8) show a hierarchical data model used by analytical engine.
Figure 8B:
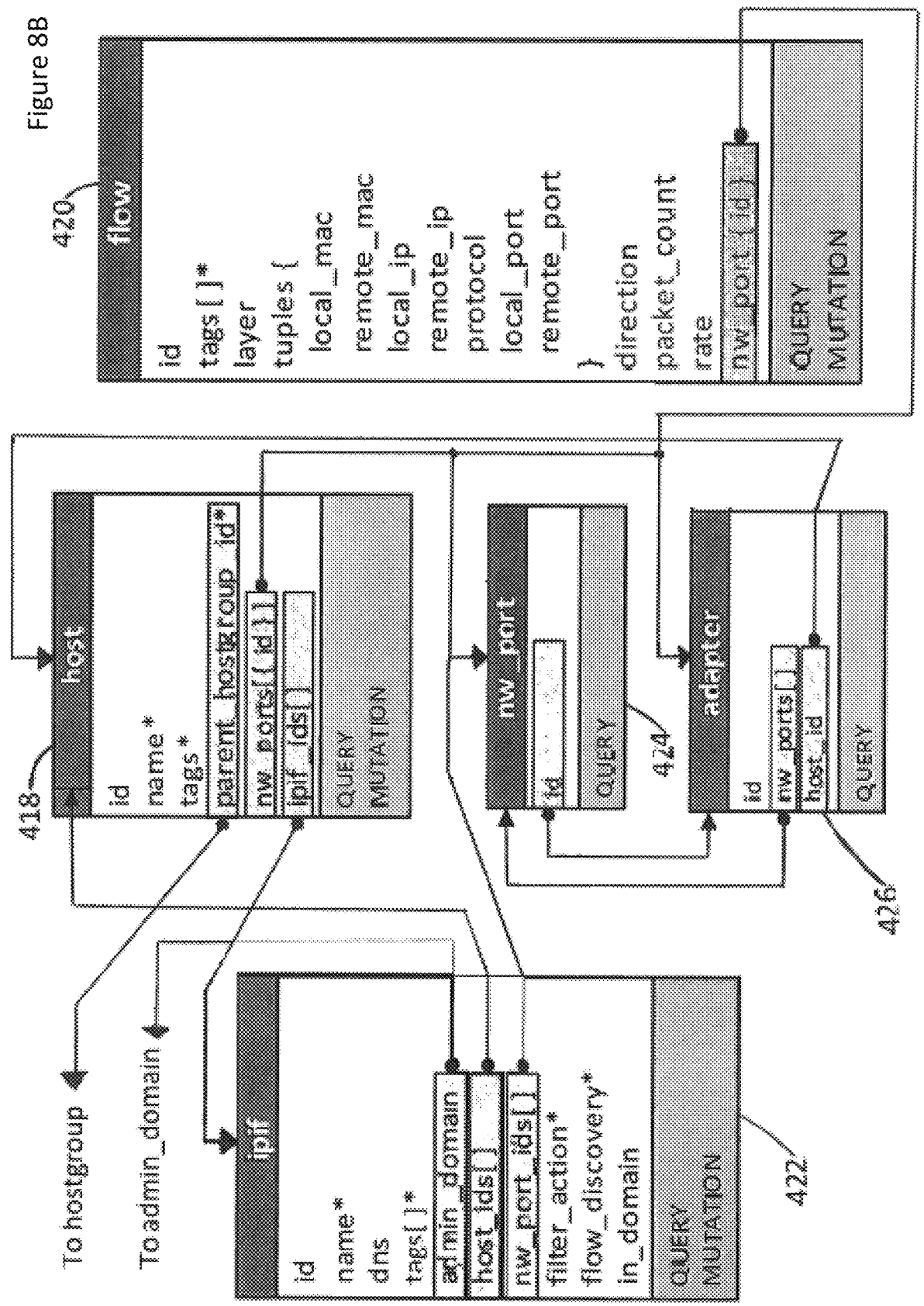

Reference is made to FIG. 7 which schematically shows the analytical engine in more detail and FIGS. 8A and 8B which schematically show the hierarchical data model of the rules abstraction subsystem shown in FIG. 7.

In some embodiments, the analytical engine may support rules abstraction. The configuring of filters for thousands of NICs using low level NFT rules is cumbersome. According in some embodiments, the analytical engine may support an abstract model where customers can define policies and roles for machines. That abstract model is applied by the analytical engine to configure the individual filters.

Some embodiments may limit the attack surface of the analytical engine by restricting analytical engine access to a limited set of APIs. REST may be used to access this limited set of APIs. Non-critical functionality that can pose a security risk (for example web GUI) can be moved out to a different machine in some embodiments.

In some embodiments, the analytical engine has a rules compiler. The rules compiler takes policies from a policy manager as an input and generates an appropriate output (for example NFTables format rules, whitelist, blacklist, counting rules or BPF or P4 programs). The compiler checks for any conflicts. Successful compilation may be required before a policy can be deployed to the NICs.

In some embodiments, the analytical engine may support a version control system to keep track of policies and changes to policy with ability to rollback if necessary.

In some embodiments, the analytical engine may have the ability to collect host IP addresses from each NIC. The NIC may learn these addresses via ARP snooping. In some embodiments, the analytical engine may collect flow information from each NIC which can be used to update policies.

The system may provide a limited set of RESTful API to the external world for policy management. RESTful objects are defined and used for the purpose.

The REST API may allow users to perform one or more of the following actions:

Set, update policies and roles;
Set, update administrative permissions;
Retrieve status and statistics;
Retrieve alerts and logs; and
Retrieve backup snapshots;
A REST API can be invoked by GUI services residing on an external machine or can be invoked by command line utilities on the controller.

FIG. 7 shows the analytical engine. The analytical engine comprises an REST API 310, a controller core 308 and a rules abstraction function 306. The rules abstraction function 306 comprises a policy manager 302 and a rules compiler 304.

The rules abstraction function 306 manages higher level representation of security rules using a hierarchical data model as shown in FIGS. 8A and 8B. As shown in FIG. 7, the rules abstraction subsystem comprises of two modules, the policy manager and the rules compiler.

The policy manager module 302 has one or more of the following functions:

Handles all incoming REST API requests and generates appropriate responses;
Generates/updates various object instances in the version control system;
Invokes the rules compiler to generate a downloadable ruleset for all applicable NICs as follows:
Upon a REST API request for applying the roles of a policy to one or more IP interfaces of a host; and Upon notification of an update to an existing IP interface (i.e. snooped IP address) from the analytical engine core;

Invoke the analytical engine core as applicable to download rules that are generated by the rules compiler.

The rules compiler module 304 is arranged to generate downloadable rules based on evaluation of policies and associated object instances.

Figure 9:
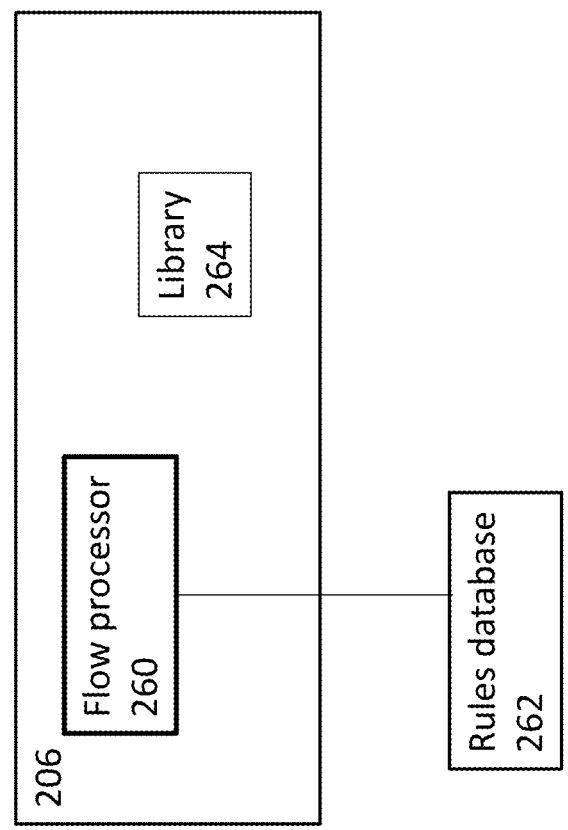
FIG. 9 schematically shows the learning functions of the analytical engine.

The NIC as previously discussed is configured to provided captured packets or parts of packets to the analytical engine Reference is made to FIG. 9 which schematically shows the learning functionality of the analytical engine. The analytical engine has a library which will receive the packet from the NIC. The flow processor 260 processes the incoming data and provides a conversion into a counter rule. This type of rule is identified as a flow sampled rule. This is a learned rule, using an AI or deep learning algorithm such as described previously.

A rules database 262 stores the flows sampled rule alongside native rules. The relevant information is extracted from the packet(s) from the NIC, tailors the counter rules and updates the rule database accordingly.

The analytical can request the packets from the NICs or all the packets can be pushed from the NIC.

A NIC can support up to N (e.g. 1000) counters. On the analytical engine side the counters need to be partitioned between the sampled rules and the native rules. The counters allow the NIC to support rules which are time based—for example a connection rate limit (would need the NIC to count the number of connections to a particular port over a time period)

Reference is now made to FIGS. 8A and 8B which shows an example of the hierarchical data mode. This rules abstraction manages the higher level representation of security rules using the hierarchical model.

In this example there are administrative domain objects 414 and infrastructure domain objects 416. Referring first to the infrastructure domain objects 416, there is NIC (adapter) object 426 at the lowest level, with the network port object 424 at the next level. The next layer objects are the flow object 420 and the ip flow object 422. Above these layers is the host object 418.

Of the administrative domain objects 414, at the lowest level is the port object 402 and ip set object 400. At the next level is a role object 404. In the next level is the flow policy object 406, the no match policy object 408 and the host group object 410. Above this is the administration domain object 412.

The role object may define the attributes of a service. The analytical device as part of it learning will identify flows which are defined by the role and define new roles for other flows.

As can be seen, there is are relationships between objects within a hierarchy and between the domains.

The NIC object is provided with object field relationships with the network port object, the ip flow object, the flow object and the host object.

The network port object is provided with object field relationships with the NIC object.

The ip flow object is provided with object field relationships with the NIC object, the host object, the no match policy object and the flow policy object as well as the administrative domain object.

The flow object is provided with object field relationships with the NIC object.

The host object is provided with object field relationships with the NIC object, the ip flow object, the network port object and the host group object.

The IP set object is provided with object field relationships with the port object, and the role object.

The port object is provided with object field relationships with the IP set object and the role object.

The role object is provided with object field relationships with the port object, the IP set object, ip flow object, and the flow policy object.

The flow policy object is provided with object field relationships with the role object and the ip flow object.

The no match policy object is provided with object field relationships with the ip flow object.

The host group object is provided with object field relationships with the host object.

The administrative domain object is provided with object field relationships with the objects in the administrative domain and the ip flow object.

Reference will now be made to FIG. 9 which shows a binding process which will bind a NIC to the controller/analytic engine. In the following acronyms, definitions and abbreviations will be used.

Kfoo Symmetric key
PIKfoo Private part of public/private key pair
PUKfoo Public part of public/private key pair
TSA Trusted Server Adapter: Refers to the securely bound NIC and controller
TSAC TSA Controller
TSAIDTSA Infrastructure Domain: A security domain encompassing a set of TSACs and TSANs
TSAN TSA NIC
TSAN-ID Unique identifier for the NIC—for example, the base MAC address
CERTfoo TLS certificate All connections to controller from other components, such as the NIC, are secure. That is, they may have the following properties:

Authentication: The component connecting to controller can be certain that it is talking to a valid controller.

Integrity: Messages passed over the connection cannot be manipulated by other parties.

Privacy: Messages passed over the connection cannot be read by other parties.

All connections may be made using SSH (secure shell), TLS, or the like.

The secure binding is the process of joining the NIC to a security domain (analytic engine). This is so as to cause the NIC to enforce the policies and configuration provided by the controller.

The binding process uses a binding ticket (TKTbind) to authorize the binding of the controller to the NIC, for example.

Binding preparation: An authorized user connects to a controller and authenticates. The user requests one or more binding tickets which the controller generates and returns.

Binding initiation: For each NIC to be bound a binding utility is invoked on a server containing the unbound NIC. Firmware is updated and a binding ticket is passed to the NIC and stored.

Binding completion: The NIC connects to the controller. Mutual authentication is performed and the binding ticket is passed to controller.

The structure of binding tickets may be known only to the controller. Other components may treat the binding tickets as opaque data.

TKTbind may comprise one or more of the following fields:

A cryptographic nonce;

NIC identity—ID;

Expiry time EXPbind; and

A signature of all the fields in binding ticket using PIKtsac (A private key of the controller).

A secure MAC (media access control) may use a key that is private to the secure domain. This key is generated by the controller and does not need to be exposed anywhere else.

The binding ticket may have the following structure:

```
/* binding ticket */
struct binding_ticket {
    uint8_t nonce[16];   /* Crypto nonce */
    uint8_t tsanid[6];   /* NIC MAC address - optional */
    uint32_t expire;     /* Expiration time */
    uint8_t version_minor; /* Binding ticket major version number */
    uint8_t version_major; /* Binding ticket minor version number */
    uint8_t sig[128];    /* DER (distinguished encoding rules)
encoded signature (ECC (elliptic curve cryptography)-384) of all of the
above fields */
};
```

Before a NIC can bind to a controller/analytical engine, a security domain needs to be established/configured. This involves following steps. These steps are done either on a controller belonging to the domain or on a separate machine:
1. Configure the securing domain.
2. Create a private key for the Root certificate of the security domain—PIKroot.
3. Generate a self-signed CA (certificate authority) root certificate (CERTroot) using PIKroot.
4. Generate the Server certificate (CERTtsac) and server private key (PIKtsac) using the CA Root certificate. When generating the CERTtsac, the security domain identity is used (can be a number or string) as an input to the CN (Common name). The CERTtsac contains the PUKtsac (public key of the security domain). Note that each controller belonging to a security domain requires a separate server certificate but all CERTtasc's may be tied to the same CERTroot associated with the security domain. These unique server certificates are identified by CERTtsac(n) where n can be an integer representing the controller ID.
5. Install CERTroot, CERTtsac(n) and PIKtsac(n) on the controller belonging to the security domain.

At this point the analytic engine/controller is ready to participate in the binding steps. Binding preparation involves generating TKTbind at the controller. One or more binding tickets are generated using one or more of the following parameters:
1. Security domain identity—same as the CN supplied during CERTtsac generation
2. Expiration time—EXPbind
3. PUKtsac Also generated is the cryptographic nonce.

The NIC may be configured with TKTbind, CERTroot and other binding configuration.

While in the ready-to-bind state the NIC periodically attempts to connect to controller. The NIC establishes a TLS or similar connection to a controller. TLS provides integrity, privacy and authentication of the controller to the NIC. During connection establishment, the NIC authenticates the controller by verifying the signature on CERTtsac using the public key from the root certificate (CERTroot).

Figure 10:
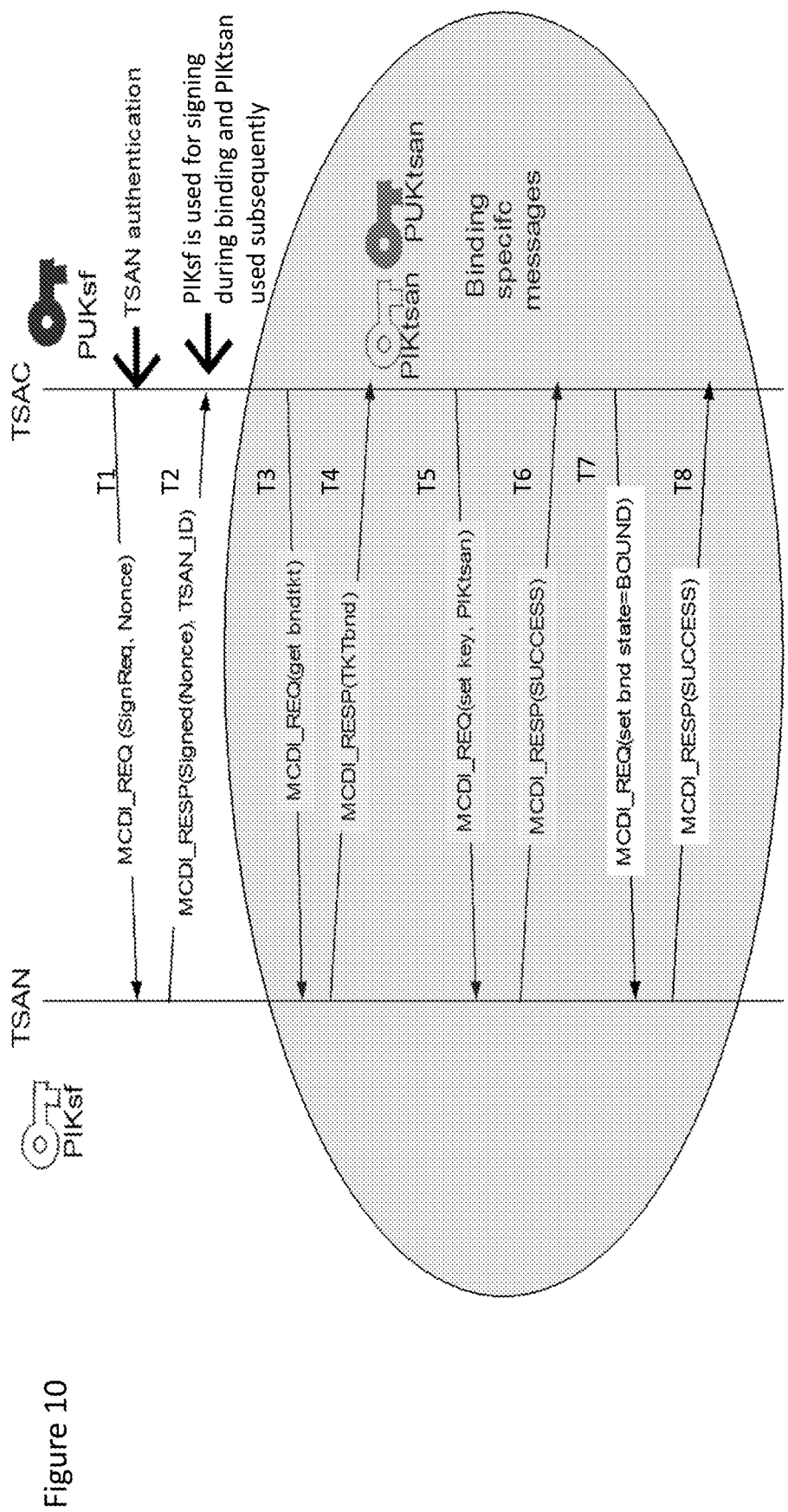
FIG. 10 shows a binding method used in some embodiments.

Once the TLS connection is complete, the controller initiates the NIC authentication and binding sequence. Authentication involves verifying that the NIC is a valid NIC. The NIC authenticates itself to the controller as shown in FIG. 10 and as will now be described.

In step T1, the controller sends a nonce via a MCDI command requesting the NIC to sign and send back the NIC ID and signed nonce N2. This step uses a NIC to sign the nonce using a private key PIK-sf which is not exposed outside of the NIC hardware. MCDI is the protocol used to talk locally from a host driver to the NIC firmware (Management Controller Driver Interface).

In step T2, the NIC sends a response to the controller by returning to the controller the signed nonce and the NIC identity—TSAN-ID, SIGN(PIKsf, {TSAN-ID, N2})}

In step T3, the controller validates the signature on N2 using the public key PUKsf. Based on the NIC identity, the controller identifies that this NIC has not completed binding and requests the binding ticket from the NIC by issuing a MCDI command.

In step T4, the NIC responds to the controller by sending the binding ticket TKTbind in MCDI response message.

In step T5, the controller validates the MAC in the binding ticket TKTbind. The binding ticket is signed by controller using PIKtsac when the ticket is generated. On receipt of the binding ticket, the controller verifies the signature using PUKtsac. The controller generates a new ECCRSA key pair PIKtsan/PUKtsan.

Optionally a client certificate containing PIKtsan and PUKtsan can be generated and used instead of individual keys. The controller stores a new entry for NIC in a database for the TSAID which includes {TSAN-ID, PUKtsan}. The controller does not store PIKtsan. The controller will send the new private key to the NIC by issuing MCDI command to install the new private key {PIKtsan, configuration}. PIKtsan is used to sign the nonce in subsequent connection attempts.

In step T6, the NIC provides a MCDI response indicating success.

In step T7, the controller provides an MCDI request to the NIC instructing the NIC to set the bind state to bound.

In step T8, the NIC acknowledges the message in a MCDI response.

The NIC is now bound to the secure domain.

It should be appreciated that the binding messages may be encrypted using the session key established during the TLS connection.

It should be appreciated that one or more of the described steps may be omitted. Two or more steps may be combined. In some embodiments, the order of one or more steps may be changed. This is one example of a method ensuring that there are secure connections between the analytical engine and the NICs are secure. However different methods may be used in different embodiments. The controller described in the above process may be provided in or by the analytical engine In the previously described embodiments, reference has been made to network interface device, sometimes referred to a NIC. A network interface device could be provided in any suitable form, including as a peripheral device or integrated with hardware of a host data processing device. A network interface device provides an interface to the network for use by its associated data processing device or the like.

The NIC may logically be a component of a server.

The NIC may be considered to be a physically separate and distinct piece of hardware and logically distinct network entity.

In some embodiments, the NIC may be implemented by a hardware device. In other embodiments, the NIC may be implemented by a hardware device along with software in an operating system for example.

In some embodiments, the analytical engine may be implemented by a hardware device. Alternatively or additionally, the analytical engine may be implemented by computer program code stored in memory and configured to run on one or more processors.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network.

In some embodiments, computer executable instructions may be downloaded to cause hardware to provide the system of embodiments.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

We claim:

1. A data analytical engine comprising:
an interface configured to receive data from a plurality of network interface devices including a first network interface device and a second network interface device, via a network, wherein a first portion of the data received from the first network interface device comprises: a first copy of all or part of the first portion of data output to a first destination by the first network interface device, and with first metadata added by the first network interface device, and wherein a second portion of the data received from the second network interface device comprises: a second copy of all or part of the second portion of data output to a second destination by the second network interface device, with second metadata added by the second network interface device; and
a memory and at least one processor configured to:
determine that data of a particular type is required from one or more network interface devices of the plurality of network interface devices and output information directed to at least one of the first and second network interface devices to cause the at least one of the first and second network interface devices to update stored rules which define what data is to be copied and directed to said data analytical engine; and
determine, using a learning algorithm applied to at least the first and second metadata received from said first and second network interface devices, whether an alert is to be generated when said received data falls outside a defined policy, and if so then to generate said alert.

2. The data analytical engine as claimed in claim 1, wherein said received data is generated in the plurality of network interface devices by processing respective received or transmitted data.

3. The data analytical engine as claimed in claim 1, wherein at least one of said first and second metadata comprises one or more of a time stamp, an event generated as a result of processing of the data, state used in the processing which generated the event, connection rate, a timeout, and an error condition.

4. The data analytical engine as claimed in claim 1, wherein said data analytical engine is configured to additionally receive data packets from at least one network interface device indicating one or more events have been determined by the at least one network interface device.

5. The data analytical engine as claimed in claim 1, a wherein the memory is configured to store information about at least one policy, wherein the at least one processor is configured to determine using said at least one policy and said learning algorithm applied to data from said network interface devices for one or more flows associated with said data if a respective policy applies to said data received from said plurality of network interface devices, and if not, storing a new policy for those one or more flows in the memory.

6. The data analytical engine as claimed in claim 1, wherein the at least one processor is configured to determine using a learning algorithm applying pattern analysis to data from said plurality of network interface devices for one or more flows associated with said data received from said plurality of network interface devices to determine anomalous behavior.

7. The data analytical engine as claimed in claim 6, wherein said at least one processor is configured to request historical data from a data store, and on receiving said requested historical data, use said historical data in said pattern analysis applied by said learning algorithm.

8. The data analytical engine as claimed in claim 6, wherein the learning algorithm is configured to perform said pattern analysis for one or more cascaded transactions relating to a higher order transaction in said received data.

9. The data analytical engine as claimed in claim 8, wherein the learning algorithm is configured to perform said pattern analysis such that the pattern analysis forms features which are constructed to discriminate said higher order transaction.

10. The data analytical engine as claimed in claim 9, wherein said features are used by said learning algorithm as part of a training set to form beliefs of said learning algorithm.

11. The data analytical engine as claimed in claim 8, wherein the learning algorithm is configured to update a policy or provide a new policy in response to said pattern analysis for one or more cascaded transactions relating to a higher order transaction in said received data.

12. The data analytical engine as claimed in claim 10, wherein the at least one processor is configured to generate an alert if the learning algorithm detects that a network flow, network packet, transaction or cascaded transaction which is one selected from (i) not covered by any existing policy and (ii) is contrary to the beliefs of the learning algorithm for normal behavior.

13. The data analytical engine as claimed in claim 1, wherein said data is received from said first network interface device and said second network interface device via a secure control plane.

* * * * *